US009754389B2

(12) United States Patent
Goshen et al.

(10) Patent No.: US 9,754,389 B2
(45) Date of Patent: Sep. 5, 2017

(54) IMAGE NOISE REDUCTION AND/OR IMAGE RESOLUTION IMPROVEMENT

(71) Applicant: KONINKLIJKE PHILIPS N.V., Eindhoven (NL)

(72) Inventors: Liran Goshen, Pardes-Hanna (IL); Asher Gringauz, Nesher (IL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 211 days.

(21) Appl. No.: 14/417,607

(22) PCT Filed: Jul. 25, 2013

(86) PCT No.: PCT/IB2013/056104
§ 371 (c)(1),
(2) Date: Jan. 27, 2015

(87) PCT Pub. No.: WO2014/024076
PCT Pub. Date: Feb. 13, 2014

(65) Prior Publication Data
US 2015/0154766 A1    Jun. 4, 2015

Related U.S. Application Data

(60) Provisional application No. 61/679,934, filed on Aug. 6, 2012.

(51) Int. Cl.
G06T 11/00 (2006.01)
G06T 3/40 (2006.01)
G06T 5/00 (2006.01)

(52) U.S. Cl.
CPC .......... *G06T 11/008* (2013.01); *G06T 3/4053* (2013.01); *G06T 5/002* (2013.01); *G06T 2207/20182* (2013.01)

(58) Field of Classification Search
None
See application file for complete search history.

(56) References Cited

U.S. PATENT DOCUMENTS 5,983,251 A * 11/1999 Martens ............... H04N 19/186
                                                          375/E7.083
6,263,103 B1 * 7/2001 Freeman ................... G06T 7/41
                                                          348/700

(Continued)

FOREIGN PATENT DOCUMENTS

| JP | 2001119586 | 4/2001 |
| JP | 2004286084 | 10/2004 |
| JP | 2006350498 | 12/2006 |

OTHER PUBLICATIONS

Deledalle et al. "Image denoising with patch based PCA: local versus global," Proceedings of the British Machine Vision Conference 2011 (BMVC), vol. 63 (3), 2011, pp. 782-789.*

(Continued)

*Primary Examiner* — Matthew Bella
*Assistant Examiner* — Soo Shin

(57) ABSTRACT

A method for improving image quality of image data includes analyzing, for each of a plurality of voxels of image data, a set of entries of a dictionary, wherein an entry represents a mapping between a lower resolution patch of voxels and a corresponding higher resolution patch of voxel or a local neighborhood around a voxel, deriving, for each of the plurality of voxels, a subspace based on the analysis, wherein the subspace is for one of the mapping or the local neighborhood, and restoring target image data based on the subspaces, wherein the target image data is image data with higher image resolution or reduced image noise.

25 Claims, 4 Drawing Sheets

(56) References Cited

U.S. PATENT DOCUMENTS

| | | | |
|---|---|---|---|
| 7,295,709 B2 | 11/2007 | Cootes et al. | |
| 2004/0218834 A1* | 11/2004 | Bishop | H04N 19/587 |
| | | | 382/299 |
| 2005/0254709 A1* | 11/2005 | Geshwind | G01J 3/02 |
| | | | 382/182 |
| 2007/0103595 A1* | 5/2007 | Gong | H04N 5/262 |
| | | | 348/620 |
| 2011/0075915 A1* | 3/2011 | Hwang | G06K 9/00228 |
| | | | 382/153 |
| 2012/0224085 A1* | 9/2012 | Al-Salem | G06T 3/4053 |
| | | | 348/239 |
| 2014/0226864 A1* | 8/2014 | Venkatraman | G01C 21/20 |
| | | | 382/107 |
| 2016/0113587 A1* | 4/2016 | Kothe | A61B 5/7203 |
| | | | 600/301 |

OTHER PUBLICATIONS

Deledalle et al., "Image denoising with patch based PCA: local versus global," Proceedings of the British Machine Vision Conference 2011 (BMVC), vol. 63 (3), 2011, pp. 782-789.*

Azzabou et al., "Image denoising based on adapted dictionary computation," IEEE International Conference on Image Processing, Sep. 16-Oct. 19, 2007.*

Lee, et al., "An MMSE approach to a nonlocal image denoising: Theory and practical implementation", J. Vis. Commun. Image R. 23 (2012) 476-490.

Azzabou, N., et al.; Image Denoising Based on Adapted Dictionary Computation; 2007; Image Processing; pp. 109-112.

Buades, A., et al.; A non-local algorithm for image denoising; 2005; IEEE Int. Conf. on Computer Vision and Pattern Recognition.

Deledalle, C-A.; et al.; Image denoising with patch based PCA: local versus global; 2011; Proc. of the British Machine Vision Conference 2011; pp. 1-10.

Dore, V., et al.; Robust NL-Means Filter with Optimal Pixel-Wise Smoothing Parameter for Statistical Image Denoising; 2009; IEEE Trans. on Signal Processing; 57(5)1703-1716.

Ebrahimi, M., et al.; Solving the inverse problem of image zooming using "self-examples"; 2007; Lecture Notes in Computer Science; 4633:117-130.

Freeman, W. T., et al.; Learning Low-Level Vision; 1999; Proc. Int'l Conf. Computer Vision; pp. 1182-1189.

Freeman, W. T., et al.; Example-based super-resolution; 2002; IEEE Comput. Graph. Appl.; 22(2)56-65.

Irani, M., et al.; Motion Analysis for Image Enhancement: Resolution, Occlusion, and Transparency; 1993; Journal of Visual Communication and Image Representation; 4(4)324-335.

Kriegel, H-P., et al.; A General Framework for Increasing the Robustness of PCA-Based Correlation Clustering Algorithms; 2008; SSDBM-LNCS; 5069:418-435.

* cited by examiner

IMAGE NOISE REDUCTION AND/OR IMAGE RESOLUTION IMPROVEMENT

CROSS REFERENCE TO RELATED APPLICATIONS

This application is a national filing of PCT application Serial No. PCT/IB2013/056104, filed Jul. 25, 2013, published as WO 2014/024076 A1 on Jul. 25, 2013, which claims the benefit of U.S. provisional application Ser. No. 61/679,934 filed Aug. 6, 2012, which is incorporated herein by reference.

The following generally relates to reducing image noise and/or improving image resolution of acquired image data and is described with particular application to computed tomography (CT).

A CT scanner generally includes an x-ray tube mounted on a rotatable gantry that rotates around an examination region about a longitudinal or z-axis. The x-ray tube emits radiation that traverses the examination region and a subject or object therein. A detector array subtends an angular arc opposite the examination region from the x-ray tube. The detector array includes one or more rows of detectors that are aligned with respect to each other and that extend along the z-axis. The detectors detect radiation that traverses the examination region and the subject or object therein and generate projection data indicative thereof. A reconstructor processes the projection data and generates 3D image data.

However, CT scanners emit ionizing radiation, which may increase a risk of cancer. This concern has been exasperated as the number of CT scans has increased and as use of CT scanning in asymptomatic patients has become more widespread. Dose deposited to the patient can be reduced by decreasing tube current and/or voltage and/or the number of scans, and/or increasing the pitch, slice thickness and/or slice spacing. However, image noise is inversely proportional to radiation dose, and thus reducing radiation dose not only reduces the dose deposited to the patient but also increases image noise in the acquired data, which is propagated to the image data during reconstruction, reducing image quality (i.e., noisier, less sharp images), which may degrade the diagnostic value of the imaging data.

A goal of image de-noising is to recover the original image from a noisy measurement through averaging. This averaging may be performed locally: the Gaussian smoothing model, the anisotropic filtering and the neighborhood filtering by the calculus of variations: the Total Variation minimization or in the frequency domain: the empirical Wiener filters and wavelet thresholding methods. Non-local means (NL) is an image de-noising process based on non-local averaging of all the pixels in an image. In particular, the amount of weighting for a pixel is based on the degree of similarity between a small patch centered around that pixel and the small patch centered around the pixel being de-noised.

Image resolution has been improved through super-resolution algorithms. Some super-resolution algorithms exceed the diffraction-limit of the imaging systems, while other super-resolution algorithms provide an improvement over the resolution of the detector. Multiple-frame super-resolution algorithms generally use sub-pixel shifts between multiple low resolution images of the same scene and improve image resolution by fusing or combining multiple low resolution images into a single higher resolution image. Learning-based super-resolution algorithms additionally incorporate application dependent priors to infer the unknown high resolution images.

In view of the above, there is an unresolved need for other approaches for reducing patient dose while preserving image quality and/or for improving image resolution.

Aspects described herein addresses the above-referenced problems and others.

In one aspect, a method for improving image quality of image data includes analyzing, for each of a plurality of voxels of image data, a set of entries of a dictionary, wherein an entry represents a mapping between a lower resolution patch of voxels and a corresponding higher resolution patch of voxel or a local neighborhood around a voxel, deriving, for each of the plurality of voxels, a subspace based on the analysis, wherein the subspace is for one of the mapping or the local neighborhood, and restoring target image data based on the subspaces, wherein the target image data is image data with higher image resolution or reduced image noise.

In another aspect, an image data processor includes an analyzer that analyzes, for each of a plurality of voxels of image data, a set of entries of a dictionary, wherein an entry represents a mapping between a lower resolution patch of voxels and a corresponding higher resolution patch of voxel or a local neighborhood around a voxel and derives, for each of the plurality of voxels, a subspace based on the analysis, wherein the subspace is for one of the mapping or the local neighborhood; and an image restore that restores target image data based on the subspaces, wherein the target image data is image data with higher image resolution or reduced image noise.

In another aspect, a computer readable medium encoded with computer executable instruction, which, when executed by a processor, causes the processor to: generate image data with higher image resolution or reduced noise based on initial image data and a non-local principle component analysis (PCA).

The invention may take form in various components and arrangements of components, and in various steps and arrangements of steps. The drawings are only for purposes of illustrating the preferred embodiments and are not to be construed as limiting the invention.

FIG. 1 schematically illustrates an example imaging system in connection with an image data processor, which is configured to improve image quality of image data.

FIG. 2 schematically illustrates an example of the image data processor.

Figure 1:
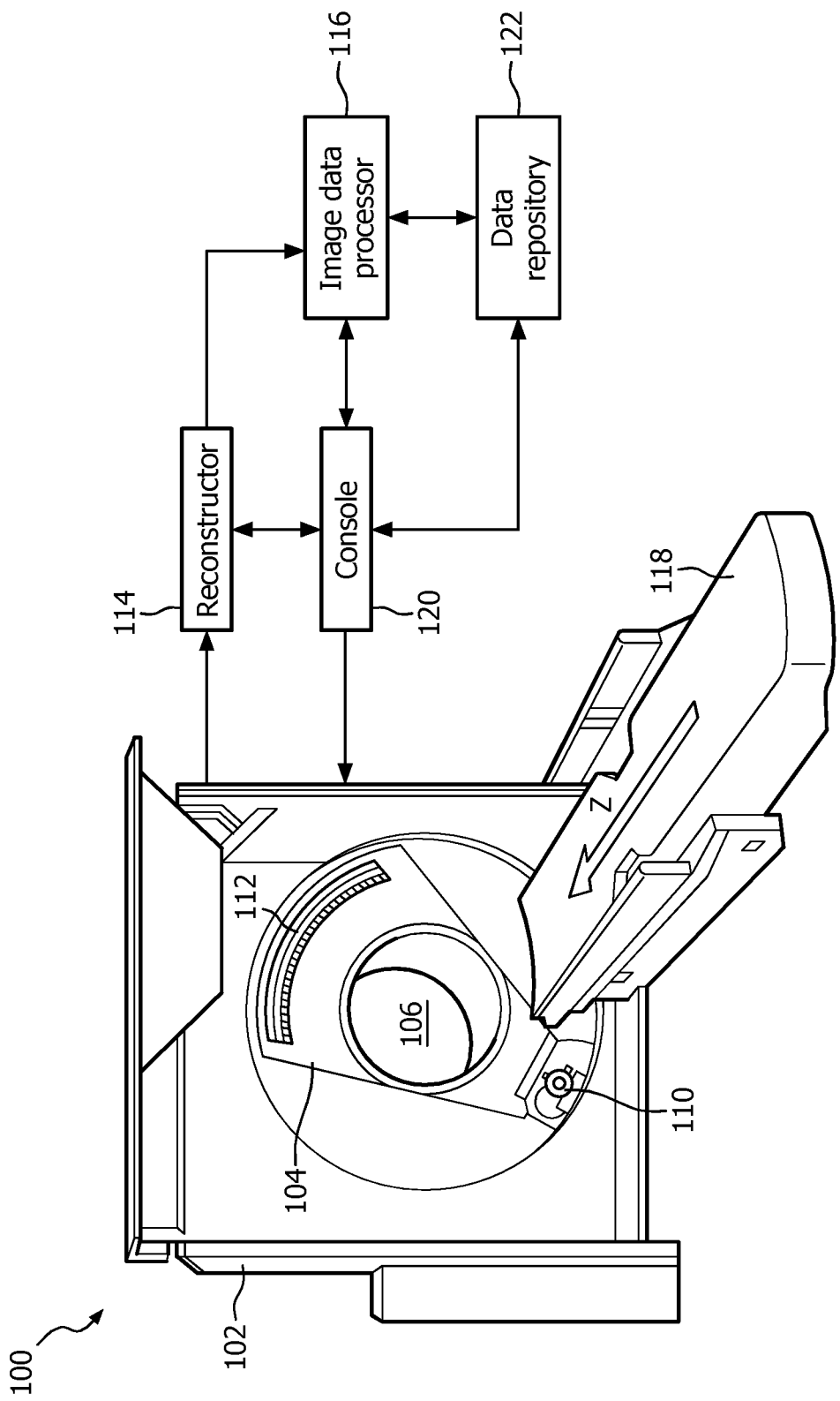

Initially referring to FIG. 1, an imaging system 100 such as a computed tomography (CT) scanner is schematically illustrated.

The imaging system 100 includes a generally stationary gantry 102 and a rotating gantry 104. The rotating gantry 104 is rotatably supported by the stationary gantry 102 and rotates around an examination region 106 about a longitudinal or z-axis.

A radiation source 110, such as an x-ray tube, is rotatably supported by the rotating gantry 104. The radiation source 110 rotates with the rotating gantry 104 and emits radiation that traverses the examination region 106. A source collimator includes collimation members that collimate the radiation to form a generally cone, wedge, fan or other shaped radiation beam.

A sensitive detector array 112 subtends an angular arc opposite the radiation source 110 across the examination region 106. The detector array 112 includes a plurality of rows of detectors that extend along the z-axis direction. The detector array 112 detects radiation traversing the examination region 106 and generates projection data indicative thereof.

A reconstructor 114 reconstructs the projection data and generates three-dimensional (3D) volumetric image data indicative thereof. The reconstructor 114 may employ a conventional 3D filtered-backprojection reconstruction, a cone beam algorithm, an iterative algorithm and/or other algorithm.

A subject support 118, such as a couch, supports an object or subject such as a human or animal patient in the examination region 106. The subject support 118 is configured to move vertically and/or horizontally before, during, and/or after a scan to position the subject or object in connection with the system 100.

A general-purpose computing system or computer serves as an operator console 120. The console 120 includes a human readable output device such as a monitor or display and an input device such as a keyboard, mouse, etc. Software resident on the console 120 allows the operator to interact with the scanner 100 via a graphical user interface (GUI) or otherwise, e.g., selecting a dose reducing and/or image quality improving algorithm, etc.

An image data processor 116 processes image data, reducing noise and/or improving image resolution of the image data. As described in greater detail below, in one instance, the image data processor 116 reduces noise and/or improves image resolution of the image date utilizing non-local principle component analysis (PCA) and a learning-based super resolution algorithm. Reducing image noise as such allows for reducing radiation for a scan (and thus the dose deposited to a patient) while maintaining image quality. Improving resolution allows for enhancing image resolution. A combination of noise reduction and improving image resolution is also contemplated herein.

The image data processor 116 can be implemented via a processor executing one or more computer readable instructions encoded or embedded on computer readable storage medium such as physical memory or other non-transitory medium. Such a processor can be part of the console 120 and/or other computing device such as a dedicated visualization computer, and/or other computing device. Additionally or alternatively, the processor can execute at least one computer readable instructions carried by a carrier wave, a signal, or other non-computer readable storage medium such as a transitory medium.

A data repository 122 can be used to store the image data generated by the system 100 and/or the image data processor 116, image data used by the image data processor 116, and/or other data. The data repository 122 may include one or more of a picture archiving and communication system (PACS), a radiology information system (RIS), a hospital information system (HIS), an electronic medical record (EMR) database, a sever, a computer, and/or other data repository. The data repository 122 can be local to the system 100 or remote from the system 100.

Figure 2:
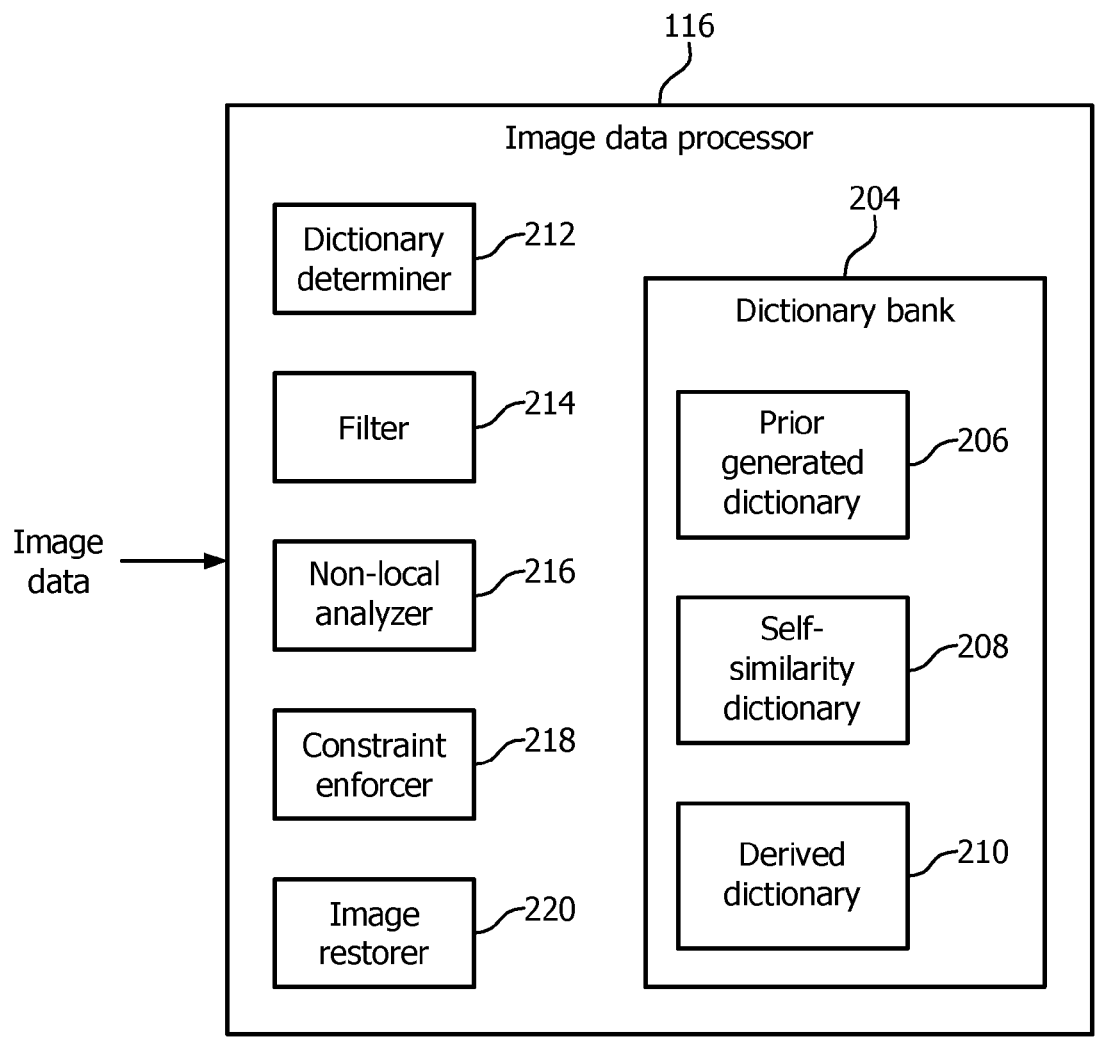

FIG. 2 schematically illustrates an example of the image data processor 116.

The illustrated image data processor 116 receives image data to be processed to increase resolution and generate higher resolution image data. This image data may be lower dose image data being processed to reduce noise and/or improve resolution, for example, to a level of that of conventional dose image data (or lower or higher). Alternatively, the image data may be conventional dose image data being processed solely to increase the resolution. The image data can come from the reconstructor 114 (FIG. 1), the data repository 122 (FIG. 1) and/or other device.

A dictionary bank 204 stores various dictionaries. The illustrated dictionary bank 204 includes at least one of a prior generated dictionary 206, a self-similarity dictionary 208 and/or derived dictionary 210. Each dictionary includes a dictionary for each voxel to be processed in the image data.

The prior generated dictionary 206 includes an already generated dictionary provided to the image data processor 116.

A dictionary determiner 212 determines the self-similarity dictionary 208 and/or derived dictionary 210. The dictionary determiner 212 may have determined the prior generated dictionary 206, for example, during earlier processing of first image data and/or other image data corresponding to the same patient and/or another patient.

For the self-similarity dictionary 208, the dictionary determiner 212 downscales the image data and generates a collection of matches between voxel neighborhoods of the downed scaled image data and the image data. In another embodiment, other voxels may additionally or alternatively be collected. In the context of noise removal, this dictionary is created as a collection of all the patches in the input study.

For the derived dictionary 210, the dictionary determiner 212 identifies a voxel neighborhood in a higher resolution image that corresponds to a voxel in the image data using a registration, matching and/or other algorithm. The derived dictionary 210 is then derived as a collection of matches between the voxel neighborhoods of higher resolution image data and downscaled higher resolution image data. The down scaling can be achieved by smoothing and/or other processing with an appropriate filter and, optionally, sub-sampling the filtered higher resolution image data.

An optional (high pass) filter 214 filters lower-frequency components in the dictionary so that a dictionary entry does not have to be stored for all possible lowest frequency component values, i.e., rather than deriving the dictionary directly on study patches, pre-processing high-pass filter is employed, in order to extract local features that correspond to their high-frequency content. The filtering allows for focusing the training on characterizing the relation between the low-resolution patches and the edges and texture content within the corresponding high-resolution ones.

A non-local analyzer 216 obtains, for each voxel, a set of dictionary entries. The non-local analyzer 216 analyzes this set of entries and derives a subspace for the estimated patch. In the context of noise removal, the subspace is for the local neighborhood around the voxel, while in the context of super resolution the subspace is of the mapping between low resolution and high resolution patch.

More specifically, for noise removal, for each voxel in the image data, patches that are similar to the currently processed patch around the voxel are identified. A data matrix is then created by putting the patches in the matrix, where each patch is corresponding to a row in the matrix. A non-weighted or weighted-PCA is then applied to the matrix, where the samples are the rows of the matrix and, in the case of weighted-PCA, the weights are function of a similarity function between the patch and/or the local noise level within the patches.

The non-local analyzer 216 then estimates the number of principle components with the largest corresponding eigenvalues which are used to model the local signalpatch. Suitable methods for modeling the local signalpatch include, but are not limited to, Akaike information criterion, Bayesian information criterion, deviance information criterion, stepwise regression, cross-validation, Mallows' Cp, focused information criterion, thresholding of ratio difference between consecutive eigenvalues and/or other estimation technique.

For super resolution, the steps are similar with the following exceptions. For each voxel in the input image, dictionary entries with a lower resolution patch similar to the currently processed patch around the voxel are identified. Each row in the matrix consists of the whole dictionary entry, i.e., concatenation of two vectors that consist of the low resolution and high resolution patches of the dictionary entry. The similarity function is between the currently processed patch and the lower resolution patch entry of the dictionary. The estimation of the number of principle components is applied, and there are corresponding measurements only for the low resolution entry patch of the dictionary.

An optional constraint enforcer 218 enforces one or more predetermined constraints, for example, a constraint on identifying similar patches. Such a constraint may be that the number of similar patches with a weighted average value larger than the weighted average value of the currently processed patch is equal to the number of patches with a smaller weighted average. This optional constraint can facilitate in some scenarios the preservation of low contrast regions.

An image restorer 220 restores target image data. In the context of noise removal, the target image data is a reduced noise image data, and in the context of super resolution the target image data is a higher resolution image data. Suitable restorations include, but are not limited to, a local approach, a global approach, and/or other approach.

The following describes an example local approach, which utilizes a greedy or other optimization approach.

For noise removal, for each voxel in the noisy study, a least-squared is used to solve the optimization shown in EQUATION 1:

$$\hat{\alpha} = \operatorname*{argmin}_{\alpha} \left( P - V_{avg} - \sum_{i=1}^{m} V_i \alpha_i \right)^2 K, \qquad \text{EQUATION 1}$$

where P is a vector corresponding to the patch around the currently processed voxel, $V_{avg}$ is vector of mean values of each columns of the matrix A, which includes relevant patches, where each patch corresponds to a row in the matrix, $V_i$ is the principle component with the i-th largest corresponding eigenvalue of the samples in the matrix A, K is a weight kernel that penalizes distance away from the currently processed voxel and m is the number of principle components that models the currently local patch.

The recovered noiseless patch is shown in EQUATION 2:

$$\hat{P} = V_{avg} + \sum_{i=1}^{m} V_i \hat{\alpha}_i. \qquad \text{EQUATION 2}$$

The recovered noiseless patches are merged by weighted averaging in the overlap area to create the final restored image.

For super resolution, for each voxel in the noisy study, a least-squared is used to solve the optimization shown in EQUATION 3:

$$\hat{\alpha} = \operatorname*{argmin}_{\alpha} \left( P - V_{avg}^{lr} - \sum_{i=1}^{m} V_i^{lr} \alpha_i \right)^2 K, \qquad \text{EQUATION 3}$$

where the lr superscript refers to the vector section that is corresponding to low resolution patch of the dictionary entry. The recovered noiseless patch is shown in EQUATION 4:

$$\hat{P} = V_{avg}^{hr} + \sum_{i=1}^{m} V_i^{hr} \hat{\alpha}_i, \qquad \text{EQUATION 4}$$

where the hr superscript refers to the vector section that is corresponding to high resolution patch of the dictionary entry.

The recovered high resolution patches are merged by weighted averaging in the overlap area to create the restored image. In case of using filtered patches, the restored image is added to an interpolated study of the input study.

An additional optional step is to enforce a global restoration constraint between the low resolution input study and the algorithm's output high resolution study. This is done efficiently using a back-projection method as shown in EQUATION 5:

$$I_{t+1}^{high} = I_t^{high} + US(I^{low} - DS(I_t^{high})), \qquad \text{EQUATION 5:}$$

where $I^{low}$ is the input study, $I_0^{high}$ is the output study of the previous step, US is an up-scaling operator and DS is a down-scaling operator.

An additional optional step is to include a gain parameter with EQUATION 5 as shown in EQUATION 6:

$$I_{t+1}^{high} = US(I^{low}) + (I_t^{high} - US(I^{low})) * g \qquad \text{EQUATION 6:}$$

where g is a gain parameter that controls an intensity of the high frequencies that are added to the image. In one instance, a default value of g is one (1), and the value of g is be set by presetting definition. An alternative option is that the value of g can be controlled by the user in real time using a scroller or the like, with the updated result presented in real time on the display.

The following describes an example global approach, which utilizes the optimization of a global cost function or other function.

For noise removal, all the voxels in the noisy study are simultaneously optimized, for example, using a least-squared is used to solve the optimization shown in EQUATION 7:

$$\hat{\alpha}_i^j = \operatorname*{argmin}_{\alpha_i^j} \sum_j \left( P^j - V_{avg}^j - \sum_{i=1}^{m^j} V_i^j \alpha_i^j \right)^2 K + \\ \lambda \sum_{j_1, j_2, k_1, k_2} (\hat{P}_{k_1}^{j_1} - \hat{P}_{k_2}^{j_2})^2 K_{k_1} K_{k_2} I_{k_1, k_2}^{j_1, j_2}, \qquad \text{EQUATION 7}$$

where $P^j$ is a vector corresponding to the patch around the voxel j, $\hat{P}_k^{\,k}$ is voxel k in the recovered patch around the voxel j, where the recovered patch around voxel j is $$\hat{P}^j = V_{avg}^j + \sum_{i=1}^{m^j} V_i^j \hat{\alpha}_i^j,$$

$V_{avg}^j$ is a vector of mean values of each columns of the matrix A for voxel j, $V_i^j$ is the principle component with the i-th largest corresponding eigenvalue of the samples in matrix A for voxel j, K is a weight kernel that penalizes distance away from its center, m' is the number of principle components that models the patch around voxel j, $K_k$ is the k element in the kernel, $I_{k1,k2}^{j1,j2}$ is an index that equal to one only if the k1 element of the patch around voxel j1 is overlapping in the study with the k2 element of the patch around voxel j2 and λ is a scalar input parameter.

The recovered noiseless patch is shown in EQUATION 8:

$$\hat{P}^j = V_{avg}^j + \sum_{i=1}^{m_j} V_i^j \hat{\alpha}_i^j. \qquad \text{EQUATION 8}$$

The recovered noiseless patches are merged by weighted averaging in the overlap area to create the final restored image.

For super resolution, all the voxels in the noisy study are simultaneously optimized, for example, using a least-squared is used to solve the optimization shown in EQUATION 9:

$$\hat{\alpha}_i^j = \underset{\alpha_i^j}{\operatorname{argmin}} \sum_j \left( P^j - V_{avg}^{lr,j} - \sum_{i=1}^{m_j} V_i^{lr,j} \alpha_i^j \right)^2 K + \qquad \text{EQUATION 9}$$
$$\lambda \sum_{j_1,j_2,k_1,k_2} (\hat{P}_{k_1}^{j_1} - \hat{P}_{k_2}^{j_2})^2 K_{k_1} K_{k_2} I_{k_1,k_2}^{j_1,j_2},$$

where the lr superscript is referring to the vector section that is corresponding to low resolution patch of the dictionary entry. The recovered noiseless patch is shown in EQUATION 10:

$$\hat{P}^j = V_{avg}^{hr,j} + \sum_{i=1}^{m_j} V_i^{hr,j} \hat{\alpha}_i^j \qquad \text{EQUATION 10}$$

where the hr superscript is referring to the vector section that is corresponding to high resolution patch of the dictionary entry.

The recovered high resolution patches are merged by weighted averaging in the overlap area to create the restored image. In case of using filtered patches, the restored image is added to an interpolated study of the input study.

An additional optional step is to enforce a global restoration constraint between the low resolution input study and the algorithm's output high resolution study. This is done efficiently using a back-projection method as shown in EQUATION 5 above.

Figure 3:
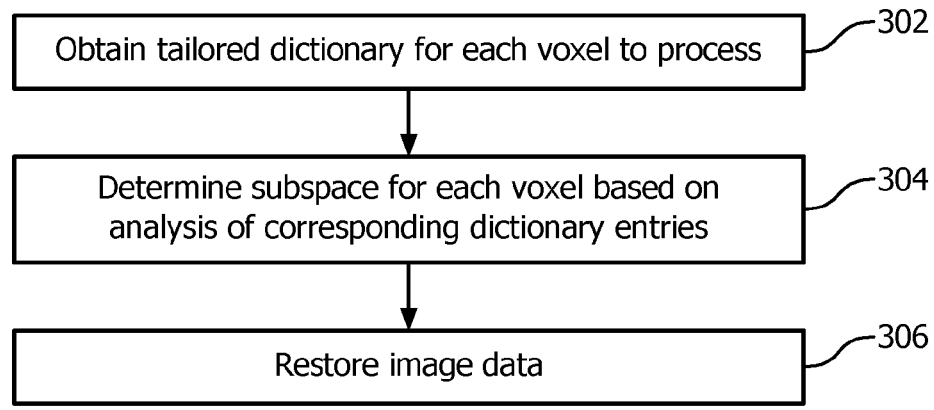
FIG. 3 illustrates a method for improving an image quality.
Figure 4:
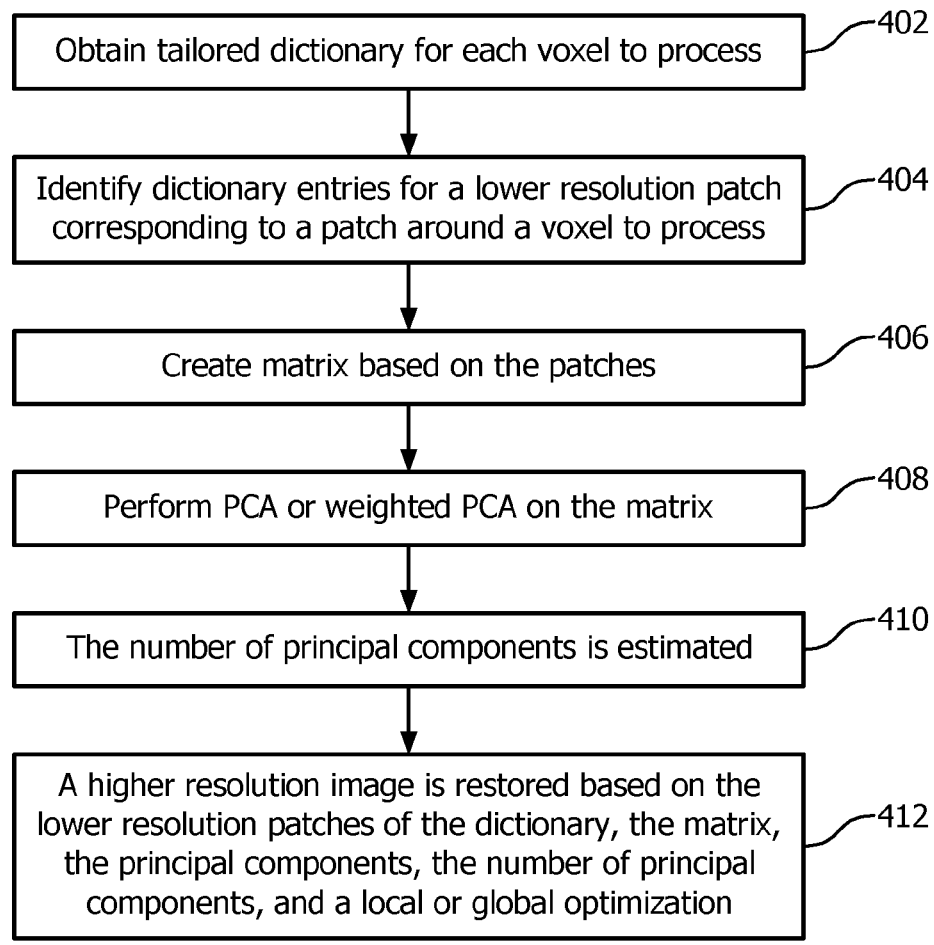
FIG. 4 illustrates a method for improving an image resolution.
Figure 5:
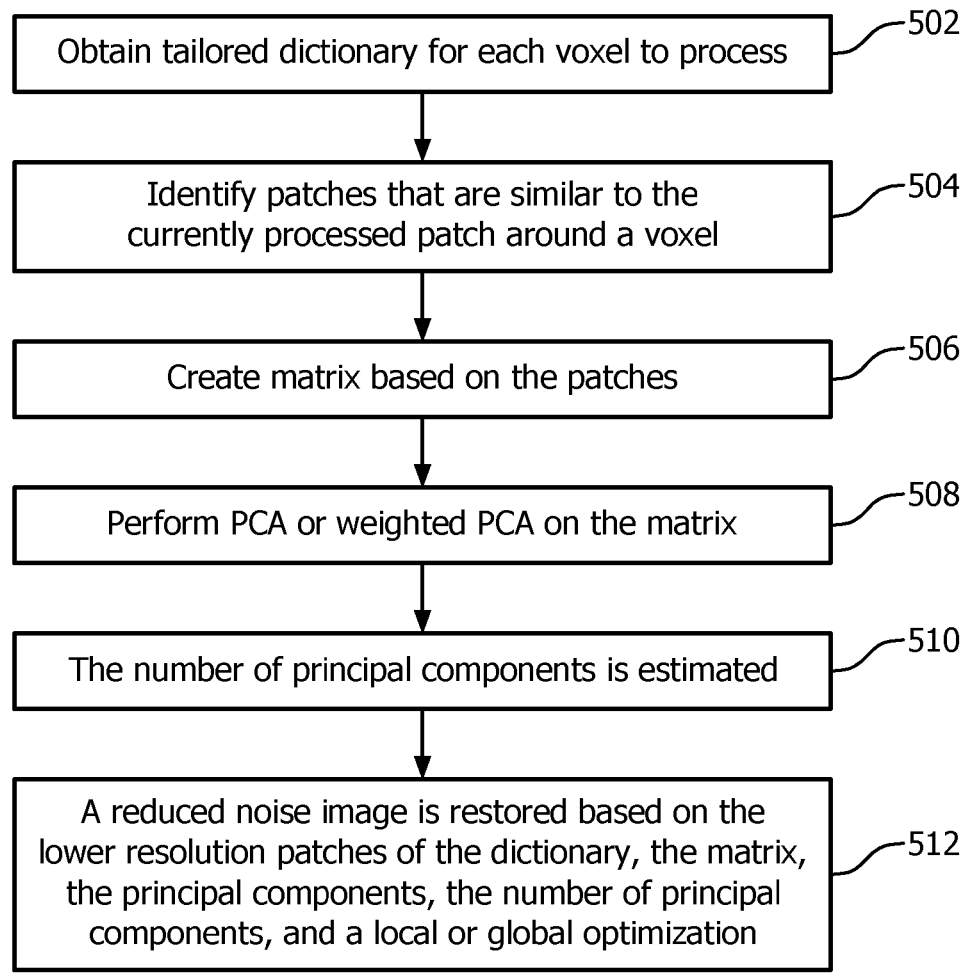
FIG. 5 illustrates a method for reducing image noise.

FIGS. 3, 4 and 5 respectively illustrate methods for improving image quality, improving image resolution and reducing noise.

It is to be appreciated that the ordering of the acts in the methods described herein is not limiting. As such, other orderings are contemplated herein. In addition, one or more acts may be omitted and/or one or more additional acts may be included.

FIG. 3 illustrates a method for improving image quality.

At 302, a tailored dictionary for each voxel to be processed is obtained. In the context of super resolution, each dictionary entry represents a mapping between low resolution and high resolution voxels. In the context of noise removal, a dictionary entry represents a building block. As described herein, the tailored dictionary is a combination of prior, self-similarity and/or derived dictionaries.

At 304, for each voxel, a subspace is determined based on an analysis of a set of corresponding dictionary entries. In the context of super resolution, the subspace is a mapping between lower resolution and higher resolution voxels. In the context of noise removal, the subspace is for the local neighborhood around the voxel.

At 306, image data is restored by incorporating local and global fidelities and compatibilities constraints. In the context of noise removal, the target image data is a reduced noise image data, and in the context of super resolution the target image data is a higher resolution image data. Suitable constraints may include compatibilities of estimated local signal with its derived signal subspace, compatibilities between neighbor signal subspaces, compatibility between low resolution and its estimated high resolution image.

FIG. 4 illustrates a method for improving image resolution.

At 402, a tailored dictionary for each voxel in image data to process is obtained. As discussed herein, each dictionary entry represents a mapping between lower resolution voxels and corresponding higher resolution voxels.

At 404, dictionary entries from the tailored dictionary are obtained for a lower resolution patch corresponding to a patch around a voxel to process.

At 406, a matrix is created based on the obtained patches. As discussed herein, each row in the matrix consists of the whole dictionary entry, i.e., concatenation of two vectors that consist of the lower resolution and the higher resolution patches of the dictionary entry.

At 408, a PCA or weighted-PCA is performed on the matrix. For this, the samples are the rows of the matrix and, in the case of a weighted-PCA, the weights are function of a similarity function between the currently processed patch and the lower resolution patch entry of the dictionary.

At 410, the number of principle components is estimated. In this case, corresponding measurements are only for the lower resolution entry patch of the dictionary.

At 412, a higher resolution image is restored based on the lower resolution patches of the dictionary, the matrix, the principal components, the number of principal components, and a local or global optimization, as described herein.

FIG. 5 illustrates a method for reducing image noise.

At 502, a tailored dictionary for each voxel in image data to process is obtained. As discussed herein, each dictionary entry represents a building block.

At 504, patches that are similar to the currently processed patch around a voxel are identified.

At 506, a matrix is created based on the obtained patches. As discussed herein, each patch corresponds to a row in the matrix.

At 508, a PCA or weighted-PCA is performed on the matrix. For this, the samples are the rows of the matrix and, in the case of a weighted-PCA, the weights are function of a similarity function between the patch and/or the local noise level within the patches.

At 510, the number of principle components is estimated. In this case, corresponding measurements are only for the lower resolution entry patch of the dictionary.

At 512, a reduced noise image is restored based on the patches around the voxels, the matrix, the principal components, the number of principal components, and a local or global optimization, as described herein.

The methods described herein may be implemented via one or more processors executing one or more computer readable instructions encoded or embodied on computer readable storage medium such as physical memory which causes the one or more processors to carry out the various acts and/or other functions and/or acts. Additionally or alternatively, the one or more processors can execute instructions carried by transitory medium such as a signal or carrier wave.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A method for improving image quality of image data, comprising:
   analyzing, for each of a plurality of voxels of image data, a set of entries of a dictionary, wherein an entry represents a mapping between a lower resolution patch of voxels and a corresponding higher resolution patch of voxel;
   identifying, for each of the plurality of voxels, lower resolution patches in the dictionary that are similar to a currently processed patch around the voxel;
   creating a data matrix with the identified patches, wherein each row in the matrix includes a concatenation of two vectors that respectively consist of the lower resolution patches and the higher resolution patches of the dictionary entry;
   performing a principal component analysis (PCA) on rows of the matrix to determine principal components;
   estimating, from a result of the PCA, a number of principle components, only for the lower resolution patches, with a largest corresponding eigenvalue to model the local patch; and
   restoring the image data to produce target image data, which has higher image resolution relative to the image data, based on the lower resolution patches from the dictionary, the matrix, the principal components, the number of principle components, and a local or global optimization.

2. The method of claim 1, wherein the restoring comprises:
   solving:

$$\operatorname*{argmin}_{\alpha} \left( P - V_{avg}^{lr} - \sum_{i=1}^{m} V_i^{lr} \alpha_i \right)^2 K,$$

where P is a vector corresponding to a patch around a currently processed voxel $\alpha_i$, $V_{avg}^{lr}$ is vector of mean values of each column of the matrix corresponding to the lower resolution patches, $V_i^{lr}$ is a principle component with an i-th largest eigenvalue, K is a weight kernel that penalizes a distance away from the currently processed voxel, and m is the number of principle components.

3. The method of claim 1, wherein the PCA is a weighted-PCA, wherein weights are a function of a similarity function between the patches.

4. The method of claim 1, wherein the local patch is modeled using one or more of: Akaike information criterion, Bayesian information criterion, deviance information criterion, stepwise regression, cross-validation, Mallows' Cp, focused information criterion, or thresholding of ratio/difference between consecutive eigenvalues.

5. The method of claim 1, wherein a number of similar patches with a weighted average value larger than a weighted average value of a currently processed patch is equal to a number of patches with a smaller weighted average.

6. The method of claim 1, wherein the restoring comprises: solving:

$$\operatorname*{argmin}_{\alpha_i^j} \sum_j \left( P^j - V_{avg}^j - \sum_{i=1}^{m^j} V_i^j \alpha_i^j \right)^2 K +$$

$$\lambda \sum_{j_1, j_2, k_1, k_2} (\hat{P}_{k_1}^{j_1} - \hat{P}_{k_2}^{j_2})^2 K_{k_1} K_{k_2} I_{k_1, k_2}^{j_1, j_2},$$

where j is a voxel index, P is a vector corresponding to a patch around a currently processed voxel $\alpha_i$, $V_{avg}^{lr}$ is a vector of mean values of each column of the matrix corresponding to the lower resolution patches, $V_i^{lr}$ is a principle component with an i-th largest eigenvalue, K is a weight kernel that penalizes a distance away from the currently processed voxel, m is the number of principle components, $\lambda$ is a scalar input parameter, k is an index, $\hat{P}_k^j$ is a voxel k in a recovered patch, $K_k$ is a k element in a kernel, and $I_{k_1, k_2}^{j_1, j_2}$ is an index.

7. The method of claim 1, wherein the restoring utilizes the global optimization to restore the image data and further comprising: merging recovered high resolution patches by weighted averaging in an overlap area to create the target image data.

8. The method of claim 1, wherein the dictionary is a combination of one or more of a prior dictionary, a self-similarity dictionary or a derived dictionary.

9. The method of claim 8, wherein the self-similarity dictionary includes a collection of matches between patches of lower resolution image data to the initial resolution image data.

10. The method of claim 9, wherein the matches include a sub-set of patches, wherein the sub-set of patches include only patches that are in a neighborhood of the lower resolution image data.

11. The method of claim 9, wherein the matches include all of the patches of the lower resolution image data.

12. The method of claim 8, wherein the derived dictionary that is derived from higher resolution image data.

13. The method of claim 1, further comprising:
   high pass filtering entries in the dictionary, thereby removing entries having a frequency lower than a predetermined frequency and generating a pre-processed dictionary, wherein the pre-processed dictionary includes local features that correspond to high-frequency content.

14. The method of claim 13, wherein the pre-processed dictionary characterizes a relation between lower-resolution patches and edges and texture content within the corresponding higher-resolution patches.

15. A non-transitory computer readable medium encoded with computer executable instruction, which, when executed by a processor, causes the processor to:
   analyze, for each of a plurality of voxels of image data, a set of entries of a dictionary, wherein an entry represents either a mapping between a lower resolution patch of voxels and a corresponding higher resolution patch of voxel, or a local neighborhood around a voxel, and create a data matrix with rows that include patches from the dictionary that are similar to a currently processed patch around a voxel;

derive, for each of the plurality of voxels, a subspace based on the analysis, wherein the subspace is for one of the mapping or the local neighborhood; and restore the image data to produce target image data, which has higher image resolution or reduced image noise relative to the image data, based on the subspaces, using a least-squares approach to optimize a local or global optimization.

16. A method for improving image quality of image data, comprising:

analyzing, for each of a plurality of voxels of noisy image data, a set of entries of a dictionary, wherein an entry represents a local neighborhood around a voxel;

identifying, for each of the plurality of voxels, patches in the dictionary that are similar to a currently processed patch around the voxel;

creating a data matrix with the identified patches, wherein each row in the matrix includes a patch;

performing a principal component analysis (PCA) on rows of the matrix to determine principal components;

estimating, from a result of the PCA, a number of principle components, for the patches with a largest corresponding eigenvalue to model the local patch;

deriving, for each of the plurality of voxels, a subspace based on the analysis, wherein the subspace is for one of the mapping or the local neighborhood; and restoring the image data to produce target image data, which has reduced image noise relative to the noisy image data, based on the patches from the dictionary, the matrix, the principal components, the number of principle components, and a local or global optimization.

17. The method of claim 16, wherein the restoring comprises: solving:

$$\underset{\alpha}{\mathrm{argmin}}\left(P - V_{avg} - \sum_{i=1}^{m} V_i \alpha_i\right)^2 K,$$

where P is a vector corresponding to a patch around a currently processed voxel $\alpha_i$, $V_{avg}$ is vector of mean values of each column of the matrix, $V_i$ is a principle component with an i-th largest eigenvalue, K is a weight kernel that penalizes a distance away from the currently processed voxel, and m is the number of principle components.

18. The method of claim 16, wherein the PCA is a weighted-PCA, wherein weights are a function of either a similarity function between a local noise level within the patches.

19. The method of claim 16, wherein the local patch is modeled using one or more of: Akaike information criterion, Bayesian information criterion, deviance information criterion, stepwise regression, cross-validation, Mallows' Cp, focused information criterion, or thresholding of ratio/difference between consecutive eigenvalues.

20. The method of claim 16, wherein a number of similar patches with a weighted average value larger than a weighted average value of a currently processed patch is equal to a number of patches with a smaller weighted average.

21. The method of claim 16, wherein the restoring comprises: solving:

$$\underset{\alpha_i^j}{\mathrm{argmin}}\sum_{j}\left(P^j - V_{avg}^j - \sum_{i=1}^{m^j} V_i^j \alpha_i^j\right)^2 K + \lambda \sum_{j_1,j_2,k_1,k_2} \left(\hat{P}_{k_1}^{j_1} - \hat{P}_{k_2}^{j_2}\right)^2 K_{k_1} K_{k_2} I_{k_1,k_2}^{j_1,j_2},$$

where j is a voxel index, P is a vector corresponding to a patch around a currently processed voxel $\alpha_i$, $V_{avg}$ is vector of mean values of each column, $V_i$ is a principle component with an i-th largest eigenvalue, K is a weight kernel that penalizes a distance away from the currently processed voxel, m is the number of principle components, $\lambda$ is a scalar input parameter, k is an index, $\hat{P}_k^j$ is a voxel k in a recovered patch, $K_k$ is a k element in a kernel, and $I_{k_1,k_2}^{j_1,j_2}$ is an index.

22. The method of claim 16, wherein the restoring utilizes the global optimization to restore the image data and further comprising: merging recovered high resolution patches by weighted averaging in an overlap area to create the target image data.

23. The method of claim 16, wherein the dictionary is a combination of one or more of a prior dictionary, a self-similarity dictionary or a derived dictionary.

24. The method of claim 16, further comprising:
high pass filtering entries in the dictionary, thereby removing entries having a frequency lower than a predetermined frequency and generating a pre-processed dictionary, wherein the pre-processed dictionary includes local features that correspond to high-frequency content.

25. The method of claim 24, wherein the pre-processed dictionary characterizes a relation between lower-resolution patches and edges and texture content within the corresponding higher-resolution patches.

* * * * *